F. K. HESSE.
GAGE.

No. 191,053.

Patented May 22, 1877.

WITNESSES  Frank K. Hesse  INVENTOR
B. W. Williams
John E. Fleming
By his Att'ys.
Henry W. Williams

UNITED STATES PATENT OFFICE.

FRANK K. HESSE, OF BOSTON, MASSACHUSETTS.

IMPROVEMENT IN GAGES.

Specification forming part of Letters Patent No. 191,053, dated May 22, 1877; application filed January 30, 1877.

*To all whom it may concern:*

Be it known that I, FRANK K. HESSE, of Boston, in the county of Suffolk and State of Massachusetts, have invented a new and useful Improvement in Calipers, which improvement is fully set forth in the following specification and accompanying drawing, in which—

Figure 1:
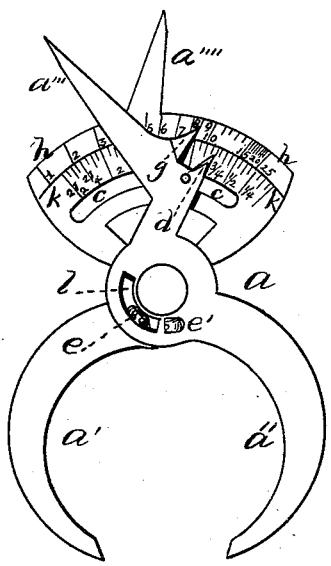
Figure 2:
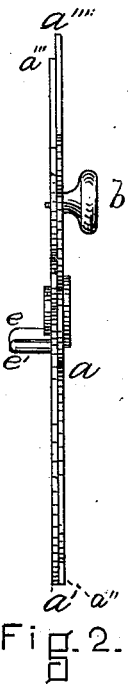

Figure 1 is a plan view of calipers embodying my invention. Fig 2 is a side view of the same.

Similar letters of reference indicate corresponding parts.

The object of this invention is to combine, with inside and outside calipers, a wire-gage, each having its index-finger and graduated scale.

$a$ represents the calipers, $a'$ $a''$ being the outside, and $a'''$ $a''''$ the inside, calipers. $b$ is a screw, running in the slot $c$, for securing the calipers at any point. $d$ is the caliper index-finger, and $k$ the scale, by inches and fractions thereof, indicating the measurement.

$e$ is a post or projection attached to the leg $a'$, and projecting through the slot $l$. $e'$ is a similar post, projecting from the leg $a''$. These posts constitute a wire-gage. The wire or metal is placed snugly between them, and the index-finger $g$ indicates upon the graduated scale $h$ the number of gage. Both the index-fingers $h$ and $k$ project from the arm $a'''$.

Thus, it will be seen that in a single instrument both the calipers and wire-gage are provided.

Of course, I do not claim as my invention the calipers $a'$ $a''$ $a'''$ $a''''$ on the index-finger $d$; but

What I claim, and desire to secure by Letters Patent, is—

In combination with the calipers $a'$ $a''$ $a'''$ $a''''$, provided with the index-finger $d$ and graduated scale $k$, the wire-gage $e$ $e'$, attached to the legs $a'$ $a''$, the former projecting through the slot $l$, the index-finger $g$, and graduated scale $h$, all combined and arranged substantially as and for the purpose herein described.

FRANK K. HESSE.

Witnesses:
 HENRY W. WILLIAMS,
 JOHN E. FRENNING.